Patented Feb. 11, 1947

2,415,779

UNITED STATES PATENT OFFICE 2,415,779

METHOD OF INCREASING RETENTION OF FILLERS IN PAPERMAKING

Clarence Walter Wilson, Norco, Calif., assignor to California Fruit Growers Exchange, Los Angeles, Calif., a corporation of California No Drawing. Application February 16, 1942, Serial No. 431,106

2 Claims. (Cl. 92—21)

This invention relates in general to the manufacture of paper. More particularly the invention relates to a method for increasing the retention of fillers and fine fibers ordinarily lost at various steps in the process of making paper.

As is well known a large amount of the paper manufactured contains fillers of one kind or another to give the paper desirable qualities. In the manufacture of newspaper, for example, fillers may be added to give the paper a better printing surface. Some inert material which is readily available and cheap, such as kaolin or china clay is usually used as a filler in the less expensive grades of paper. Other and more expensive materials are often used as fillers in the manufacture of high grade papers.

The clay or other filler is added in the beater. The amount of filler used varies over a comparatively wide range, depending upon the type of paper being produced and the filler employed. In general, for paper which is to be subsequently used for newspaper printing, it has been found desirable to add about 10% to 15%, based on the weight of the paper finally recovered from the beater batch. Of the clay added, about 30% to 50% is retained in the finished paper, the balance being, for the most part, carried away in the white water.

It is obvious from the above that a very considerable amount of filler is lost. Associated with this filler loss is the loss of fine fibers which also occurs for the most part in the white water draining from the Fourdrinier. Although in some cases a portion of the white water is re-used, a very considerable portion is discarded, so that the filler and fine fibers carried therein are lost. Some paper makers object to any re-use of the white water, preferring instead to use fresh water exclusively, permitting all the white water to go to waste. When cheap clays are used as fillers, the economic waste is probably not great. When such fillers as titanium oxide, and other more expensive fillers are used, the economic waste may be very appreciable.

I have discovered that it is possible to materially increase the filler retention and diminish the fine fiber loss by the use of those materials ordinarily referred to as pectates, and particularly the so-called fibrous pectates. Pectic substances, which are widely distributed in plants, are considered to be complex colloidal carbohydrate derivatives which contain a large proportion of anhydroglacturonic acid units which are thought to exist in chain-like combination. Pectin is a well known substance of this group. Other substances of this group are protopectin, pectinic acid, and pectic acid. This latter substance is thought to be mostly composed of colloidal polyglacturonic acids. The salts of pectic acid are designated as pectates. The pectates are found to exist in at least two forms, conveniently designated by a difference in the visual appearance of their alcohol precipitates, as a "non-fibrous" form and a "fibrous" form. The fibrous pectates, of which the alkaline earth forms are water insoluble and the alkali forms are soluble, seem only to be prepared directly from protopectin, the water insoluble parent pectic substance which occurs in plants. The pectates are further characterized by their ability to make low solids gels (see "Citrus Pectates," Industrial and Engineering Chemistry, volume 33, pages 287–291, inclusive, March 1941, particularly at page 289). These pectate gels differ from the ordinary sugar gels prepared with pectin, which latter require relatively high percentages of soluble solids for their formation. The fibrous pectates differ from the non-fibrous pectates, not only with respect to the fibrosity of their precipitates, but also in that the fibrous pectates tend to produce aqueous dispersions, often called "solutions," of much greater viscosity than proportionately corresponding dispersions of non-fibrous pectates.

In general my invention comprises incorporating an aqueous dispersion of preferably a fibrous pectate with the paper pulp suspension, prior to passage of the suspension to the Fourdrinier. Not only am I able to increase the filler retention in the paper, and thereby diminish the amount of filler added to each beater batch, but I am able also to diminish the fine fiber loss. Accordingly, an object of my invention is to provide and disclose methods and means of increasing the filler retention in the paper.

Another object of my invention is to provide and disclose methods and means of decreasing the fine fiber loss.

Further objects, uses, and advantages of my invention will appear more fully and at large hereinafter and will become apparent to those skilled in the art from a description of the preferred process embodied in my invention.

As mentioned before, materials which I use to increase the filler retention and decrease the fine fiber and filler loss are those commonly referred to as pectates. I prefer to operate with the fibrous pectates described in U. S. Patent No. Re. 21,077. Ordinarily I choose to use a purified fibrous pectate, although if the paper being manufactured is of such a quality and grade that the presence of a small amount of color is not objectionable, I may use the crude pectated pulp disclosed in the above patent as a source of the fibrous pectate.

For the finer grades of paper, the advantages to be gained by the use of a purified pectate will be very worthwhile since the purified pectate is in itself only slightly colored and should, in the amount used, impart practically no color to the finished paper. As mentioned before I use the pectate in the form of an aqueous dispersion. The purified pectate may be dispersed in water at room temperature, although the use of warm or hot water speeds the dispersion. I find that a dispersion of the pectate is facilitated by having the body of water in rapid motion and then sifting the required amount of dry pectate into the body of water. A stock batch of pectate may be made containing about 4% pectate by weight, and this stock dispersion diluted to about ½ to 1% prior to the incorporation of the dispersion with the paper pulp suspension. It seems desirable to add the pectate dispersion in dilute form in order to facilitate mixing of the pectate dispersion with the paper pulp suspension. The purified pectate may be advantageously used in amounts as low as 1% based on the weight of the paper pulp in the suspension. This is not an absolute minimum, but, based on my present experiences, is regarded as a low range, in good practice. Larger percentages of pectate may be used if desired.

When using crude pectated pulp as a source of fibrous pectate I use, for example, a sodium carbonate and sodium pyrophosphate as dispersion aids. The dry pectated pulp is mixed with the dispersion aid in accordance with the following proportions by weight:

|  | Parts |
|---|---|
| Crude pectated pulp | 20 |
| Sodium carbonate | 1 |
| Sodium pyrophosphate | 1 |

The above dry mixture is used as a base for the preparation of the aqueous dispersion. One part of the pulp mixture is added to 20 parts of hot, and preferably boiling, water with continuous agitation. The dispersion is agitated until a complete dispersion of the pulp has been obtained. If there are any large undispersed particles or coarse particles of pectated pulp left in the dispersion, these may be removed by screening. Ordinarily I have found that it is satisfactory to pass the dispersion through a screen of about 100 mesh in order to remove the coarse particles of pectated pulp and any undissolved pectated pulp. Other means may be used to separate the particles from the dispersion, as by centrifuging. If, however, the pulp is finely ground and the dispersion complete, this step may not be necessary. This dispersion may then be cooled and diluted with further amounts of water, if desired, and incorporated with the paper pulp suspension, just prior to the passage of the pulp to the Fourdrinier. The crude pectated pulp dispersion is preferably added to the paper pulp suspension in quantities sufficient to add about 1% fibrous pectate based on the weight of the paper pulp in the suspension. Larger percentages of the material may be used, if it is found desirable, in the form of aqueous dispersions. My invention, while broadly applicable, is admirably adapted to processes involving the Fourdrinier machine. This well known machine essentially consists of an endless web of wire gauze, supported horizontally on a number of rollers and traveling continuously in one direction. The paper pulp flows onto the gauze wire from a storage tank called the "stuff chest." Usually a fan pump takes the paper pulp suspensions from the stuff chest to the wire gauze. Thickness of the sheet is regulated by the supply of pulp. Spreading on the top of the gauze is assisted by means of a spreader. The wire gauze is given a sidewise shaking motion which felts the pulp while the water drains therefrom. Also the gauze passes over suction boxes which assist in drawing away water from the felted pulp. The web is next transferred to an endless blanket which carries it between squeeze rolls and then onto the couch roll and finally to the press rolls, drying cylinders, and calendar rolls to compact, dry, and polish the paper. In the example above, the pectate dispersion is added just ahead of the Fourdrinier, as, for example, into the intake of the fan pump, in order to allow only the minimum elapse of time for the gel formation before the suspension passes to the wire gauze.

While a clear understanding of the chemistry of my process is not necessary to its successful operative use, I wish to point out that the improved filler and fine fiber retention obtained by the use of pectate dispersions as hereinabove disclosed, depends upon the formation of a gel which, during its formation, tends to occlude or entrap the filler and fine fibers. This gel, by the nature of the paper-making process in the course of which it is being formed, is formed as discrete particles. These gel particles are formed from the added pectate dispersion as a necessary consequence of the normal presence in the pulp suspension of water-soluble constituents which react with the fibrous pectate to form the gel. The pectate gel particles are characterized by their ability to give up water readily, so that these particles are easily de-watered along with the paper pulp suspension. The gel particles formed in the pulp suspension tend also to fill the voids through which the filler and fine fibers pass as the pulp travels over the Fourdrinier but without seriously retarding or interfering with the drainage of the water from the pulp.

Having thus described my invention in such clear, concise, and exact terms as to enable others skilled in the art to make and use the same, I claim as my invention and desire to secure by Letters Patent the following:

1. A method of decreasing the filler and fine fiber loss during the manufacture of paper comprising adding to a suspension of paper pulp and a mineral filler an aqueous dispersion of water soluble pectate, and immediately thereafter passing said pulp suspension on to a screen and forming thereon a paper felt having a high retention of filler and fine fiber.

2. A method of decreasing the filler and fine fiber loss during the manufacture of paper comprising adding to a suspension of paper pulp and a mineral filler an aqueous dispersion of water soluble pectate in an amount not less than about one per cent of pectate based on the weight of the paper pulp in the suspension, and immediately thereafter passing said pulp suspension on to a screen and forming thereon a paper felt having a high retention of filler and fine fiber.

CLARENCE WALTER WILSON.

REFERENCES CITED

The following references are of record in the file of this patent:

UNITED STATES PATENTS

| Number | Name | Date |
|---|---|---|
| 2,293,466 | Juhasz | Aug. 18, 1942 |
| 1,838,949 | Leo | Dec. 29, 1931 |
| 2,132,064 | Wilson | Oct. 4, 1938 |
| 1,105,195 | Greenwood | July 28, 1914 |
| 1,280,400 | Clapp | Oct. 1, 1918 |
| 1,333,255 | Imaoko | Mar. 9, 1920 |
| 2,069,766 | Compte | Feb. 9, 1937 |

FOREIGN PATENTS

| Number | Country | Date |
|---|---|---|
| 476,778 | Br. | Dec. 15, 1937 |
| 477,600 | Br. | Mar. 30, 1936 |
| 164 | Br. | 1857 |
| 688,527 | Fr. | Apr. 26, 1930 |

OTHER REFERENCES

Industrial and Engineering Chemistry, Mar. 1941, page 290.

Chemical Abstracts, vol. 25, page 19574. (Div. 6.)

Chemical Abstracts, vol. 31, page 27024. (Div. 6.)

Chemical Abstracts, vol. 32, page 54856. (Div. 6.)

Manufacture of Pulp and Paper (1938), vol. 4, section 4, pages 12 and 13.

Industrial and Engineering Chemistry, vol. 13, page 103, Feb. 15, 1941. 260–209.5.

Chemical Abstracts, vol. 33, 56532. (Div. 6.)

Chemical Abstracts, vol. 32, 68588. (Div. 6.)

Chemical Abstracts, vol. 31, 72479. (Div. 6.)

Chemical Abstracts, vol. 27, 38272. (Div. 6.)

The Chemical Age, May 17, 1941, p. 281.

Chemical Abstracts, vol. 35, 64513.

Science News Letter, Apr. 26, 1941, page 258.